United States Patent
Liu

(10) Patent No.: US 12,200,615 B2
(45) Date of Patent: Jan. 14, 2025

(54) NETWORK INFORMATION PROCESSING METHOD AND TERMINAL DEVICE

(71) Applicant: VIVO MOBILE COMMUNICATION CO., LTD., Guangdong (CN)

(72) Inventor: Longqing Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 395 days.

(21) Appl. No.: 17/678,262

(22) Filed: Feb. 23, 2022

(65) Prior Publication Data

US 2022/0182925 A1 Jun. 9, 2022

Related U.S. Application Data

(63) Continuation of application No. PCT/CN2020/103580, filed on Jul. 22, 2020.

(30) Foreign Application Priority Data

Sep. 29, 2019 (CN) .......................... 201910936843.5

(51) Int. Cl.
  *H04W 84/04* (2009.01)
  *H04W 48/16* (2009.01)

(52) U.S. Cl.
  CPC .......... *H04W 48/16* (2013.01); *H04W 84/042* (2013.01)

(58) Field of Classification Search
  None
  See application file for complete search history.

(56) References Cited

U.S. PATENT DOCUMENTS

| | | | | |
|---|---|---|---|---|
| 2011/0038372 | A1* | 2/2011 | Wijayanathan | H04W 8/26 370/389 |
| 2012/0077456 | A1* | 3/2012 | Tiwari | H04W 48/16 455/404.1 |

(Continued)

FOREIGN PATENT DOCUMENTS

| | | |
|---|---|---|
| CN | 101674635 A | 3/2010 |
| CN | 103238353 A | 8/2013 |

(Continued)

OTHER PUBLICATIONS

First Office Action for Chinese Application No. 201910936843.5, dated Feb. 8, 2021, 8 Pages.

(Continued)

*Primary Examiner* — Jenkey Van
(74) *Attorney, Agent, or Firm* — BROOKS KUSHMAN P.C.

(57) ABSTRACT

Embodiments of this disclosure provide a network information processing method and a terminal device. The method includes: obtaining M PLMN identifiers, where the M PLMN identifiers are identifiers of M equivalent public land mobile networks EPLMNs, the M EPLMNs are equivalent networks of a registered public land mobile network RPLMN, the RPLMN is a network currently accessed by a terminal device, and M is a positive integer; and in a case that a target list of the terminal device includes at least one of the M PLMN identifiers obtained by an obtaining module, forbidding adding an identifier of the RPLMN to the target list, where the PLMN identifier in the target list is an identifier of a PLMN in which the terminal device is forbidden from accessing a 4G network.

20 Claims, 8 Drawing Sheets

(56) References Cited

U.S. PATENT DOCUMENTS

| | | | |
|---|---|---|---|
| 2012/0135730 A1 | 5/2012 | Rangaiah et al. | |
| 2015/0065132 A1 | 3/2015 | Ramkumar et al. | |
| 2018/0070297 A1* | 3/2018 | Shu | H04W 48/16 |
| 2019/0159115 A1* | 5/2019 | Russell | H04L 65/1016 |
| 2019/0357116 A1* | 11/2019 | Huang-Fu | H04W 48/02 |
| 2020/0245224 A1* | 7/2020 | Agiwal | H04W 48/02 |
| 2021/0306974 A1 | 9/2021 | Peng et al. | |
| 2022/0086743 A1* | 3/2022 | Chun | H04W 48/18 |

FOREIGN PATENT DOCUMENTS

| | | |
|---|---|---|
| CN | 105493574 A | 4/2016 |
| CN | 108601017 A | 9/2018 |
| CN | 109451564 A | 3/2019 |
| CN | 110022553 A | 7/2019 |
| CN | 110708738 A | 1/2020 |
| EP | 2439989 A1 | 4/2012 |
| IN | 107682855 A | 2/2018 |
| WO | 2018166234 A1 | 9/2018 |

OTHER PUBLICATIONS

First Office Action for Indian Application No. 202227007740, dated Jul. 6, 2022, 6 Pages (including English translation).

International Search Report and Written Opinion for Application No. PCT/CN2020/103580, dated Oct. 27, 2020, 9 Pages.

"GTM-203-3GWA AT Commands Manual," Jul. 29, 2014, pp. 59-92, accessed Jul. 6, 2022, URL: http://ftp.icpdas.com/pub/cd/usbcd/napdos/3g_modem/gtm-29/07/2014203m-3gwa/manual/GTM-203M-3GWA ATCommands Manual.pdf, 485 Pages (11 parts).

Global System for Mobile Communications, "3rd Generation Partnership Project; Technical Specification Group Core Network and Terminals; Mobile Radio Interface Layer 3 Specification; Core Network Protocols; Stage 3," 3GPP TS 24.008, Jun. 2008, V.8.2.0, Release 8, 553 Pages (12 parts).

Extended European Search Report for Application No. 20869686.4-1216, dated Oct. 12, 2022, 10 Pages.

3GPP, "3rd Generation Partnership Project; Technical Specification Group Core Network and Terminals; Non-Access-Stratum (NAS) Functions Related to Mobile Station (MS) in Idle Mode," 3GPP TS 23.122, Sep. 2019, V16.3.0, 75 Pages.

3GPP, "3rd Generation Partnership Project; Technical Specification Group Core Network and Terminals; Non-Access-Stratum (NAS) Protocol for Evolved Packet System (EPS); Stage 3," 3GPP TS 24.301, Sep. 2019, V16.2.0, 558 Pages.

* cited by examiner

NETWORK INFORMATION PROCESSING METHOD AND TERMINAL DEVICE

CROSS-REFERENCE TO RELATED APPLICATIONS

This application is a continuation application of International Application No. PCT/CN2020/103580 filed on Jul. 22, 2020, which claims priority to Chinese Patent Application No. 201910936843.5 filed on Sep. 29, 2019, which are incorporated herein by reference in their entireties.

TECHNICAL FIELD

Embodiments of this disclosure relate to the field of communications technologies, and in particular, to a network information processing method and a terminal device.

BACKGROUND

In a long term evolution (LTE) system, after a terminal device selects a public land mobile network for access, if an exception occurs during access to the PLMN (for example, the access is denied), an identifier of the PLMN will be added to a "forbidden 4G PLMN list" in the terminal device.

At present, after the terminal device has accessed a 4G registered public land mobile network (registered PLMN, RPLMN), or when the terminal device goes back to a 4G coverage area in a currently accessed RPLMN (2G RPLMN or 3G RPLMN), if a network device in the currently accessed RPLMN is configured with an equivalent public land mobile network (equivalent PLMN, EPLMN) of the RPLMN, and the EPLMN is in the forbidden 4G PLMN list in the terminal device, the RPLMN is also added to the forbidden 4G PLMN list. In this way, the terminal device may hand over from a 4G network to a 2G/3G network, or the terminal device may not be able to access a 4G network in the 4G coverage area. As a result, the terminal device cannot camp on the 4G network in the 4G network or 4G coverage area.

SUMMARY

Embodiments of this disclosure provide a network information processing method and a terminal device to resolve the problem that an existing terminal device cannot camp on a 4G network in a 4G network or 4G coverage area.

To resolve the foregoing technical problem, this disclosure is implemented as follows.

According to a first aspect, an embodiment of this disclosure provides a network information processing method applied to a terminal device, where the method includes: obtaining M PLMN identifiers, where the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer; and in a case that a target list of the terminal device includes at least one of the M PLMN identifiers obtained by an obtaining module, forbidding adding an identifier of the RPLMN to the target list, where the PLMN identifier in the target list is an identifier of a PLMN in which the terminal device is forbidden from accessing a 4G network.

According to a second aspect, an embodiment of this disclosure provides a terminal device, where the terminal device includes an obtaining module and a processing module. The obtaining module is configured to obtain M PLMN identifiers, where the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer. The processing module is configured to, in a case that a target list of the terminal device comprises at least one of the M PLMN identifiers obtained by the obtaining module, forbid adding an identifier of the RPLMN to the target list, where the PLMN identifier in the target list is an identifier of a PLMN in which the terminal device is forbidden from accessing a 4G network.

According to a third aspect, an embodiment of this disclosure provides a terminal device, where the terminal device includes a processor, a memory, and a computer program stored in the memory and capable of running on the processor, and when the computer program is executed by the processor, the steps of the network information processing method according to the first aspect are implemented.

According to a fourth aspect, an embodiment of this disclosure provides a computer-readable storage medium, where the computer-readable storage medium stores a computer program, and when the computer program is executed by a processor, the steps of the network information processing method according to the first aspect are implemented.

In the embodiments of this disclosure, M PLMN identifiers may be obtained, where the M PLMN identifiers are identifiers of M equivalent public land mobile networks EPLMNs, the M EPLMNs are equivalent networks of a registered public land mobile network RPLMN, the RPLMN is a network currently accessed by a terminal device, and M is a positive integer; and in a case that a target list of the terminal device includes at least one of the M PLMN identifiers obtained by an obtaining module, an identifier of the RPLMN is forbidden from being added to the target list, where the PLMN identifier in the target list is an identifier of a PLMN in which the terminal device is forbidden from accessing a 4G network. With this solution, when an EPLMN configured by a network is in a "forbidden 4G PLMN list", the terminal device can effectively decide whether it is necessary to forbid a 4G RPLMN service, so that the embodiments of this disclosure can not only increase a 4G registration success rate, but also can avoid a problem of slow network camping caused by frequent attempts when a 4G network cannot be registered with.

DETAILED DESCRIPTION

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

The term "and/or" in the specification describes an association relationship for describing associated objects and represents that three relationships may exist. For example, A and/or B may represent the following three cases: Only A exists, both A and B exist, and only B exists. The symbol "/" herein indicates an "or" relationship of associated objects. For example, A/B means A or B.

The terms "first", "second", and so on in the specification and the claims herein are intended to distinguish between different objects but do not indicate a particular order of the objects. For example, a first PLMN, a second PLMN, and the like are used to distinguish between different PLMNs, rather than to describe a specific order of the PLMNs.

In the embodiments of this disclosure, the terms such as "an example" or "for example" are used to represent an example, an illustration, or a description. Any embodiment or design solution described as "an example" or "for example" in the embodiments of this disclosure shall not be interpreted to be more preferential or advantageous than other embodiments or design solutions. To be precise, the terms such as "example" or "for example" are intended to present a related concept in a specific manner.

In the descriptions of the embodiments of this disclosure, "a plurality of" means two or more than two, for example, a plurality of processing units mean two or more processing units; a plurality of elements mean two or more elements; and so on, unless otherwise specified.

A terminal device in the embodiments of this disclosure may be a terminal device with an operating system. The operating system may be an Android operating system, may be an iOS operating system, or may be another possible operating system, which is not specifically limited in the embodiments of this disclosure.

The following uses the Android operating system as an example to describe a software environment to which a network information processing method provided in the embodiments of this disclosure is applied.

Figure 1:
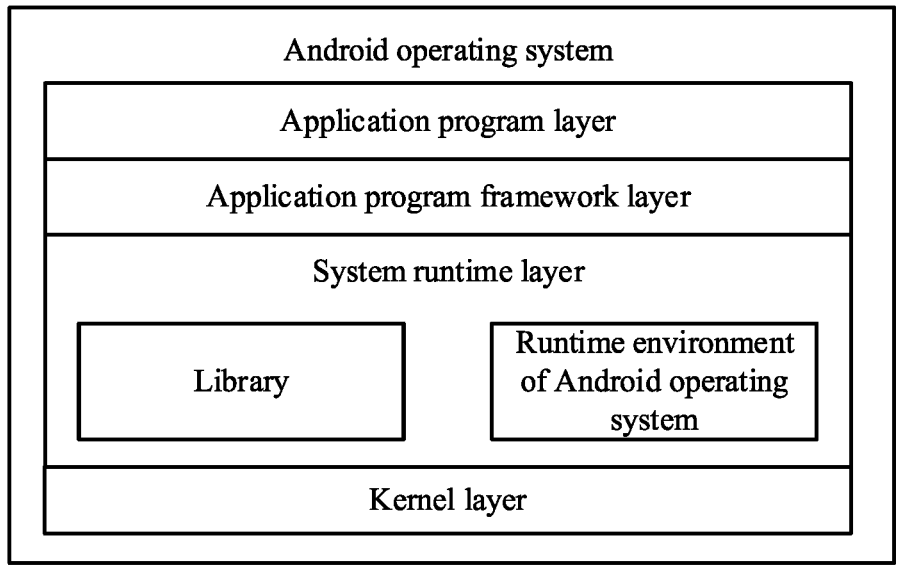
FIG. 1 is a schematic diagram of a possible architecture of an Android operating system according to an embodiment of this disclosure.

FIG. 1 is a schematic diagram of a possible architecture of an Android operating system according to an embodiment of this disclosure. In FIG. 1, an architecture of the Android operating system consists of four layers: an application program layer, an application program framework layer, a system runtime layer, and a kernel layer (which may be specifically a Linux kernel layer).

The application program layer includes various application programs (including system application programs and third-party application programs) in the Android operating system.

The application program framework layer is a framework of application programs, and developers may develop some application programs based on the application program framework layer in compliance with development principles of the framework of application programs.

The system runtime layer includes a library (also called a system library) and a runtime environment of the Android operating system. The library mainly provides various resources required by the Android operating system. The runtime environment of the Android operating system is used to provide a software environment for the Android operating system.

The kernel layer is an operating system layer of the Android operating system, and is a bottom layer in software layers of the Android operating system. The kernel layer provides core system services and hardware-related drivers for the Android operating system based on the Linux kernel.

The Android operating system is used as an example. In the embodiments of this disclosure, the developers may develop, based on the system architecture of the Android operating system shown in FIG. 1, a software program for implementing the network information processing method provided in the embodiments of this disclosure, so that the network information processing method can be executed based on the Android operating system shown in FIG. 1. In other words, a processor or a terminal device may implement the network information processing method provided in the embodiments of this disclosure by running the software program in the Android operating system.

The terminal device in this embodiment of this disclosure may be a mobile terminal or a non-mobile terminal. For example, the mobile terminal may be a mobile phone, a tablet computer, a notebook computer, a palmtop computer, a vehicle-mounted terminal, a wearable device, an ultra-mobile personal computer (UMPC), a netbook, a personal digital assistant (PDA), or the like. The non-mobile terminal may be a personal computer (PC), a television (TV), a teller machine, a self-service machine, or the like. This is not specifically limited in the embodiments of this disclosure.

The following first explains some nouns or terms involved in the claims and specification of this disclosure.

PLMN (public land mobile network): A cellular mobile communications network of a specific standard offered by an operator in a specific country or region is called a PLMN. The PLMN is a network built and operated by the government or its approved operators for the purpose of providing land mobile communication services to the public. This network can be interconnected with other communications networks such as a public switched telephone network (PSTN) to form an entire communications network at the regional or country level. PLMN=MCC+MNC. For example, the PLMN of China Mobile is 46000, 46002, and 46007;
the PLMN of China Unicorn is 46001 and 46006; and
the PLMN of China Telecom is 46003 and 46005.

EPLMN (equivalent PLMN, equivalent public land mobile network): is a PLMN that is equivalent to and has the same priority as a PLMN currently selected by a terminal device.

RPLMN (registered PLMN, registered public land mobile network): is a PLMN registered with by the terminal device before the terminal device was shut down or disconnected last time and temporarily stored on a USIM card of the terminal device.

HPLMN (home PLMN, home public land mobile network): is a PLMN corresponding to an IMSI corresponding to the USIM of the terminal device. For a user, there is only one home PLMN.

EHPLMN (equivalent HPLMN, equivalent home public land mobile network): is a home PLMN equivalent to the PLMN currently selected by the terminal device. For example, an operator corresponding to the HPLMN may have different number segments. For example, China Mobile has three number segments: 46000, 46002, and 46007, among which 46002 is EHPLMN relative to 46000. The HPLMN is written into the USIM card when the operator burns the card. If the terminal device is in its home country or region, EPLMN=EHPLMN; if the terminal device is roaming, EPLMN!=EHPLMN.

4G RPLMN (also known as RPLMN 4G): is a registered public land mobile network based on fourth-generation mobile communications technologies.

2G RPLMN (also known as RPLMN 2G): is a registered public land mobile network based on second-generation mobile communications technologies.

3G RPLMN (also known as RPLMN 3G): is a registered public land mobile network based on third-generation mobile communications technologies.

Abnormal LTE registration scenario in the live network: An EPLMN carried in air interface signaling by a network side includes one or more PLMNs that already exist in a "forbidden 4G PLMN List", and these PLMNs have had abnormal registration before, for example, continuously rejected by the network with a cause value of cause#15 (No suitable cells in tracking area), causing a current 4G RPLMN also to be forbidden. For example, there may be an abnormal registration scenario for international roaming or an abnormal registration scenario for national roaming.

International roaming (International Roaming, referring to shared mobile country code (Mobile Country Code, MCC)): A China Mobile card roams back from a Hong Kong network to a mainland local network, an EPLMN of China Mobile that is deployed in a border area (for example, a customs clearance port) includes a local mobile network and a Hong Kong roaming network, but the China Mobile card cannot register with a 4G Hong Kong roaming network, and therefore is added to the "forbidden 4G PLMN list".

National roaming (National Roaming, referring to not shared MCC): There is a 2G/3G roaming registration agreement between an Indian Idea card and a Vodafone network, but there is no 4G roaming registration agreement. The Idea network has configured Vodafone as an EPLMN, but a Vodafone 4G network cannot be registered with and is added to a "forbidden 4G PLMN list".

According to 3GPP 24.008 Specification Section 4.1.1.9 and 3GPP 24.301 Specification Section 5.3.4, EPLMNs are considered equal or equivalent to PLMNs in terms of network selection, cell selection, and cell reselection. When the terminal device registers with an RPLMN 4G or goes back to a 4G coverage area of a currently registered PLMN (RPLMN), the RPLMN is also added to the "forbidden 4G PLMN list" because the EPLMN configured by the network exists in the "forbidden 4G PLMN list", and therefore the RPLMN 4G is forbidden. Correspondingly, the terminal device falls back from a 4G network to a 2G/3G network or does not register with 4G in the 4G coverage area.

Figure 2:
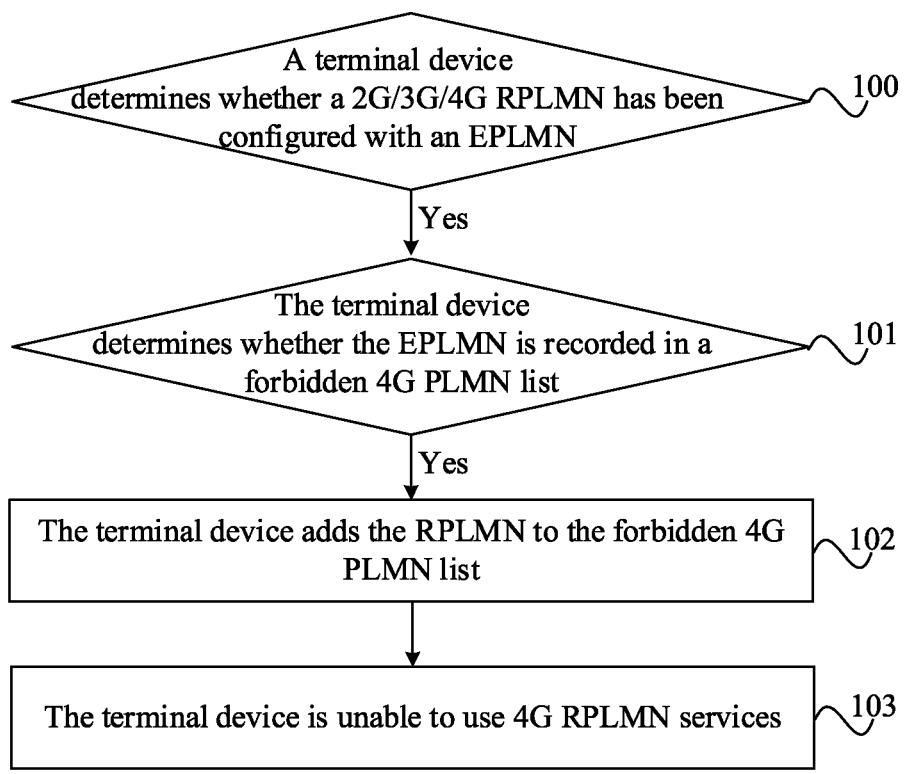
FIG. 2 is a schematic diagram of a network information processing method according to the related art.

As shown in FIG. 2, a network information processing method according to the related art may include the following steps 100 to 103.

Step 100: A terminal device determines whether a 2G/3G/4G RPLMN has been configured with an EPLMN.

If the terminal device determines that the 2G/3G/4G RPLMN has been configured with the EPLMN, the terminal device proceeds to perform the following step 101.

Step 101: The terminal device determines whether the EPLMN is recorded in a forbidden 4G PLMN list.

If the terminal device determines that the EPLMN is recorded in the forbidden 4G PLMN list, the terminal device proceeds to perform the following step 102.

Step 102: The terminal device adds the RPLMN to the forbidden 4G PLMN list.

Step 103: The terminal device is unable to use 4G RPLMN services.

That is, in the related art, when the terminal device registers with a 4G RPLMN or the terminal device goes back to a 4G coverage area of a currently registered PLMN, a 4G service cannot be used because the RPLMN is added to the "forbidden 4G PLMN list". Users can have the opportunity to use a 4G RPLMN service only by enabling or disabling the flight mode, performing hot plugging, restarting the terminal device, or waiting until the forbidden 4G timer expires.

In view of this, embodiments of this disclosure provide a network information processing method and a terminal device. M PLMN identifiers may be obtained, where the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer; and in a case that a target list of the terminal device includes at least one of the M PLMN identifiers obtained by an obtaining module, an identifier of the RPLMN is forbidden from being added to the target list, where the PLMN identifier in the target list is an identifier of a PLMN in which the terminal device is forbidden from accessing a 4G network. With this solution, when an EPLMN configured by a network is in a "forbidden 4G PLMN list", the terminal device can effectively decide whether it is necessary to forbid a 4G RPLMN service, so that the embodiments of this disclosure can not only increase a 4G registration success rate, but also can avoid a problem of slow network camping caused by frequent attempts when a 4G network cannot be registered with.

The network information processing method provided in the embodiments of this disclosure may be executed by the foregoing terminal device, or by a functional module and/or functional entity capable of implementing the network information processing method in the terminal device, which may be specifically determined depending on an actual use requirement and is not limited in the embodiments of this disclosure. The terminal device is used as an example below to illustrate the network information processing method provided in the embodiments of this disclosure.

The following illustrates the network information processing method provided in the embodiments of this disclosure with reference to the accompanying drawings.

Figure 3:
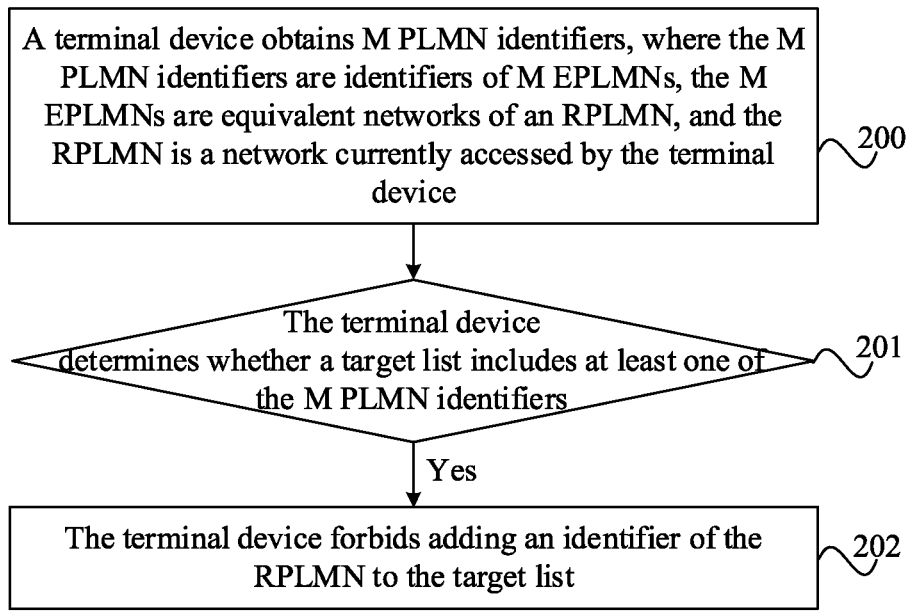
FIG. 3 is a first schematic diagram of a network information processing method according to an embodiment of this disclosure.

As shown in FIG. 3, an embodiment of this disclosure provides a network information processing method. The network information processing method may include the following steps 200 to 202.

Step 200: A terminal device obtains M PLMN identifiers, where the M PLMN identifiers are identifiers of M EPLMNs, the M EPLMNs are equivalent networks of an RPLMN, the RPLMN is a network currently accessed by the terminal device, and M may be a positive integer.

In this embodiment of this disclosure, after the terminal device has accessed a 4G registered public land mobile network (registered PLMN, RPLMN), or when the terminal device goes back to a 4G coverage area of a currently accessed RPLMN (2G RPLMN or 3G RPLMN), the terminal device may obtain the identifiers of the M EPLMNs to further determine whether an EPLMN of the RPLMN is recorded in a "forbidden 4G PLMN list" (that is, the target list mentioned below).

In this embodiment of this disclosure, the identifiers of the M EPLMNs may be stored in a universal subscriber identity module (USIM) of the terminal device. Therefore, the terminal device may obtain the identifiers of the M EPLMNs from the USIM card.

Step 201: The terminal device determines whether a target list includes at least one of the M PLMN identifiers.

The PLMN identifier in the target list is an identifier of a PLMN in which the terminal device is forbidden from accessing a 4G network. In other words, the target list is used to store identifiers of PLMNs in which the terminal device is forbidden from accessing a 4G network. The target list may be described as "forbidden 4G PLMN list" below.

In this embodiment of this disclosure, the target list may be stored in a registration status context of the terminal device, and includes one or more entries, where each entry corresponds to one PLMN identifier (PLMN ID) and is used to record a cause value of a current USIM card being forbidden from accessing a 4G network under the PLMN and forbidden 4G duration. The registration status context will be reset and cleared in the case of restarting the terminal device, enabling or disabling the flight mode, and removing the card.

Source scenarios of the "forbidden 4G PLMN list" are described in 3GPP TS 24.301 Section 4.5 Disabling and re-enabling of UE's E-UTRA capability, for example, the following two typical scenarios:

Scenario 1: An attach request or tracking area updating request initiated on LTE is rejected by a network; and accordingly, a rejection cause value is #15 (No suitable cells in tracking area). A 4G PLMN that a terminal device currently attempts to access is forbidden, and an identifier of the PLMN that the terminal device currently attempts to access is added to the "forbidden 4G PLMN list".

Scenario 2: Random access fails with weak signals on LTE, and after an attempt counter reaches a specified maximum number of attempts (for example, 5), a 4G PLMN that a terminal device currently attempts to access is forbidden, and an identifier of the PLMN that the terminal device currently attempts to access is added to the "forbidden 4G PLMN list".

It should be noted that the foregoing description uses the target list as an example. It can be understood that, in actual implementation, identifiers of PLMNs in which the terminal device is forbidden from accessing a 4G network may be stored in any other possible storage form in the embodiments of this disclosure. This may be specifically determined depending on an actual requirement, and is not limited in the embodiments of this disclosure.

In this embodiment of this disclosure, if the terminal device determines that the target list includes at least one of the M PLMN identifiers, the terminal device may proceed to perform step 202 below; and if the terminal device determines that the target list does not include any one of the M PLMN identifiers, the terminal device may not perform an operation.

Step 202: The terminal device forbids adding an identifier of the RPLMN to the target list.

In this embodiment of this disclosure, after obtaining the M PLMN identifiers, if the terminal device determines that the target list includes at least one of the M PLMN identifiers, that is, the terminal device determines that an EPLMN corresponding to the RPLMN is recorded in the "forbidden 4G PLMN list", the terminal device forbids adding the identifier of the RPLMN to the target list (in other words, the identifier of the RPLMN is not added to the target list).

When an EPLMN configured by a network is in a "forbidden 4G PLMN list", the terminal device can effectively decide whether it is necessary to forbid a 4G RPLMN service. This not only increases a 4G registration success rate, but also avoids a problem of slow network camping caused by frequent attempts when a 4G network cannot be registered with.

In the network information processing method according to this embodiment of this disclosure, M PLMN identifiers may be obtained, where the M PLMN identifiers are identifiers of M equivalent public land mobile networks EPLMNs, the M EPLMNs are equivalent networks of a registered public land mobile network RPLMN, the RPLMN is a network currently accessed by a terminal device, and M is a positive integer; and in a case that a target list of the terminal device includes at least one of the M PLMN identifiers obtained by an obtaining module, an identifier of the RPLMN is forbidden from being added to the target list, where the PLMN identifier in the target list is an identifier of a PLMN in which the terminal device is forbidden from accessing a 4G network. With this solution, when an EPLMN configured by a network is in a "forbidden 4G PLMN list", the terminal device can effectively decide whether it is necessary to forbid a 4G RPLMN service, so that the embodiments of this disclosure can not only increase a 4G registration success rate, but also can avoid a problem of slow network camping caused by frequent attempts when a 4G network cannot be registered with.

It should be noted that there may be a situation in which the RPLMN has been recorded in the "forbidden 4G PLMN list". In this case, the RPLMN should still be recorded in the list, and its cause value and forbidden 4G duration will not be affected. Specifically, the terminal device may first determine whether the RPLMN is recorded in the "forbidden 4G PLMN list", if the terminal device determines that the RPLMN is not recorded in the "forbidden 4G PLMN list", the terminal device performs the foregoing steps 200 to 202; or if the terminal device determines that the RPLMN has been recorded in the "forbidden 4G PLMN List", the terminal device does not perform the foregoing steps 200 to 202.

Optionally, in this embodiment of this disclosure, the RPLMN may be a 4G network, a 2G network, or a 3G network. In different networks, specific implementations of the network information processing method provided in this embodiment of this disclosure are different. The first and second implementations described below are respectively for a case that the RPLMN is a 4G network and a case that the RPLMN is a 2G network or a 3G network.

First Implementation

Figure 4:
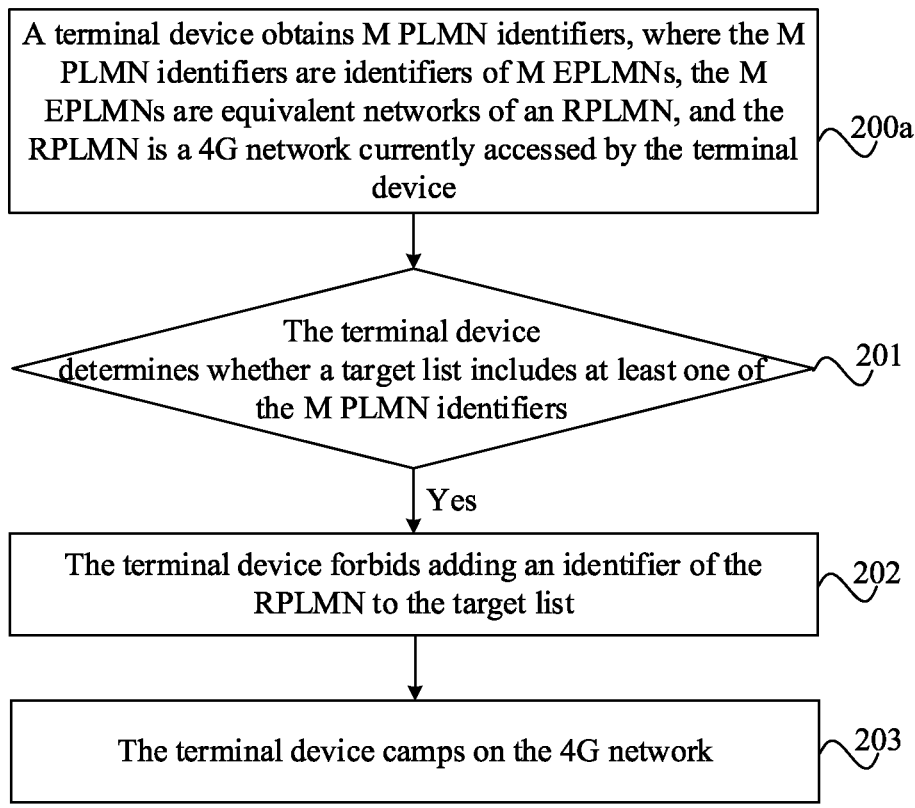
FIG. 4 is a second schematic diagram of a network information processing method according to an embodiment of this disclosure.

In the first implementation, the RPLMN may be a 4G network. Correspondingly, with reference to FIG. 3, as shown in FIG. 4, the foregoing step 200 may be specifically implemented by the following step 200a.

Step 200a: A terminal device obtains M PLMN identifiers, where the M PLMN identifiers are identifiers of M EPLMNs, the M EPLMNs are equivalent networks of an RPLMN, and the RPLMN is a 4G network currently accessed by the terminal device.

In this embodiment of this disclosure, when the RPLMN is a 4G network currently accessed by the terminal device, the terminal device may first determine whether the 4G network has been configured with EPLMNs, and in a case that the 4G network has been configured with EPLMNs, the terminal device obtains identifiers of the EPLMNs configured for the 4G network.

Optionally, the terminal device may determine through any of the following signaling (1) and (2), whether the 4G network has been configured with EPLMNs:

(1) attach accept; and
(2) tracking area update accept.

In the first implementation, with reference to FIG. 3, as shown in FIG. 4, after the foregoing step 202a, the network information processing method provided in this embodiment of this disclosure may further include the following step 203.

Step 203: The terminal device camps on the 4G network.

In this embodiment of this disclosure, when the RPLMN is a 4G network currently accessed by the terminal device, if the terminal device determines that the EPLMNs corresponding to the RPLMN are recorded in the "forbidden 4G PLMN list", the terminal device forbids adding the identifier of the RPLMN to the target list. Further, the identifier of the RPLMN is not included in the target list, so that the terminal device can still camp on the 4G network.

In this embodiment of this disclosure, when the EPLMNs configured by the 4G RPLMN are in the "forbidden 4G PLMN list", the terminal device can still camp on the 4G network. Therefore, according to this embodiment of this disclosure, the 4G network camping rate can be increased, and user experience can be improved.

Second Implementation

Figure 5:
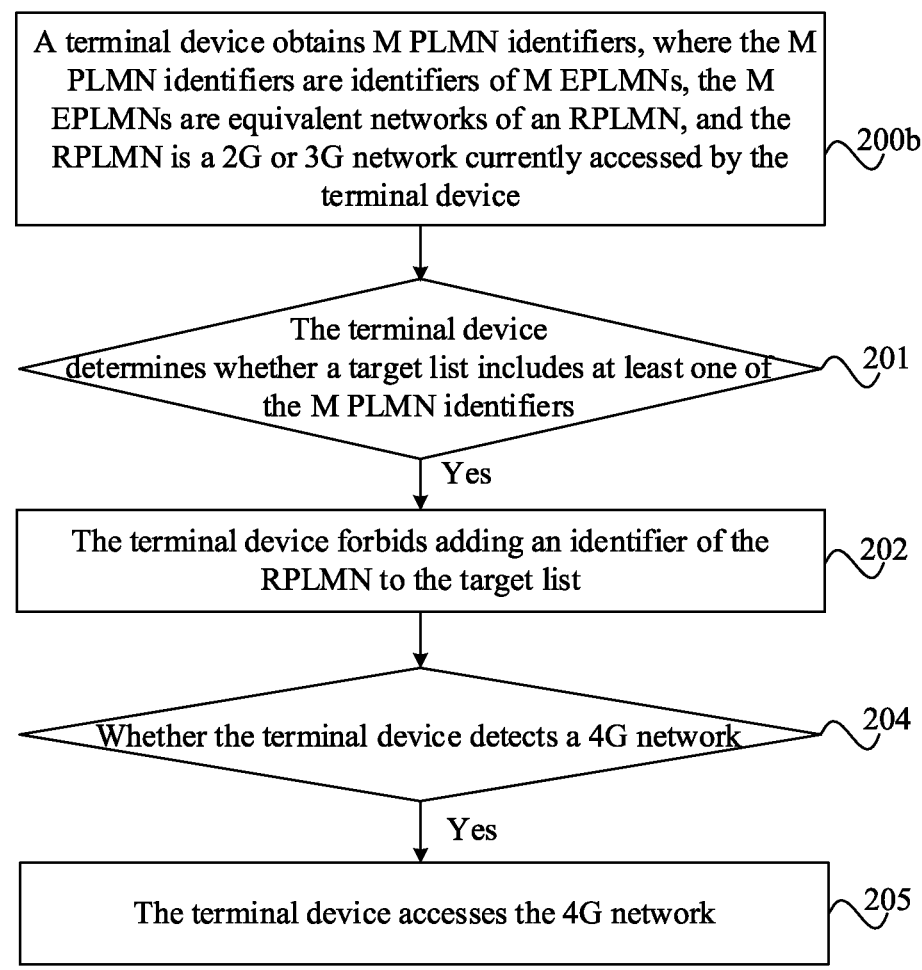
FIG. 5 is a third schematic diagram of a network information processing method according to an embodiment of this disclosure.

In the second implementation, the RPLMN may be a 2G network or a 3G network. Correspondingly, with reference to FIG. 3, as shown in FIG. 5, the foregoing step 200 may be specifically implemented by the following step 200b.

Step 200b: The terminal device obtains M PLMN identifiers, where the M PLMN identifiers are identifiers of M EPLMNs, the M EPLMNs are equivalent networks of an RPLMN, and the RPLMN is a 2G or 3G network currently accessed by the terminal device.

For ease of description, the following uses an example in which the RPLMN is a 3G network currently accessed by the terminal device, for illustration. For the description of the case that the RPLMN is 2G network, reference may be made to the following description for the case that the RPLMN is a 3G network, and details will not be repeated herein.

In this embodiment of this disclosure, when the RPLMN is a 3G network currently accessed by the terminal device, the terminal device may first determine whether the 3G network has been configured with EPLMNs, and in a case that the 3G network has been configured with EPLMNs, the terminal device obtains identifiers of the EPLMNs configured for the 3G network.

Optionally, the terminal device may determine, through any of the following signaling (a) to (c), whether the 3G network has been configured with EPLMNs:

(a) location updating accept signaling;
(b) GPRS attach accept signaling; and
(c) routing area updating accept signaling.

In the second implementation, with reference to FIG. 3, as shown in FIG. 5, after the foregoing step 202b, the network information processing method provided in this embodiment of this disclosure may further include the following steps 204 and 205.

Step 204: Whether the terminal device detects a 4G network.

In this embodiment of this disclosure, if the terminal device detects a 4G network, the terminal device may proceed to perform the following step 205; and if the terminal device does not detect a 4G network, the terminal device may not perform an operation (that is, camps on the 2G network or 3G network).

Step 205: The terminal device accesses the 4G network.

In this embodiment of this disclosure, when the RPLMN is a 2G or 3G network currently accessed by the terminal device, if the terminal device determines that the EPLMNs corresponding to the RPLMN are recorded in the "forbidden 4G PLMN list", the terminal device forbids adding an identifier of the RPLMN to the target list. Further, the identifier of the RPLMN is not included in the target list, so that the terminal device may have an opportunity to access the 4G network. Further, in a case of detecting a 4G network, the terminal device may access the 4G network. In this way, this embodiment of this disclosure can avoid a problem of slow network camping caused by frequent attempts when the 4G network cannot be registered with, thereby increasing a 4G registration success rate.

Figure 6:
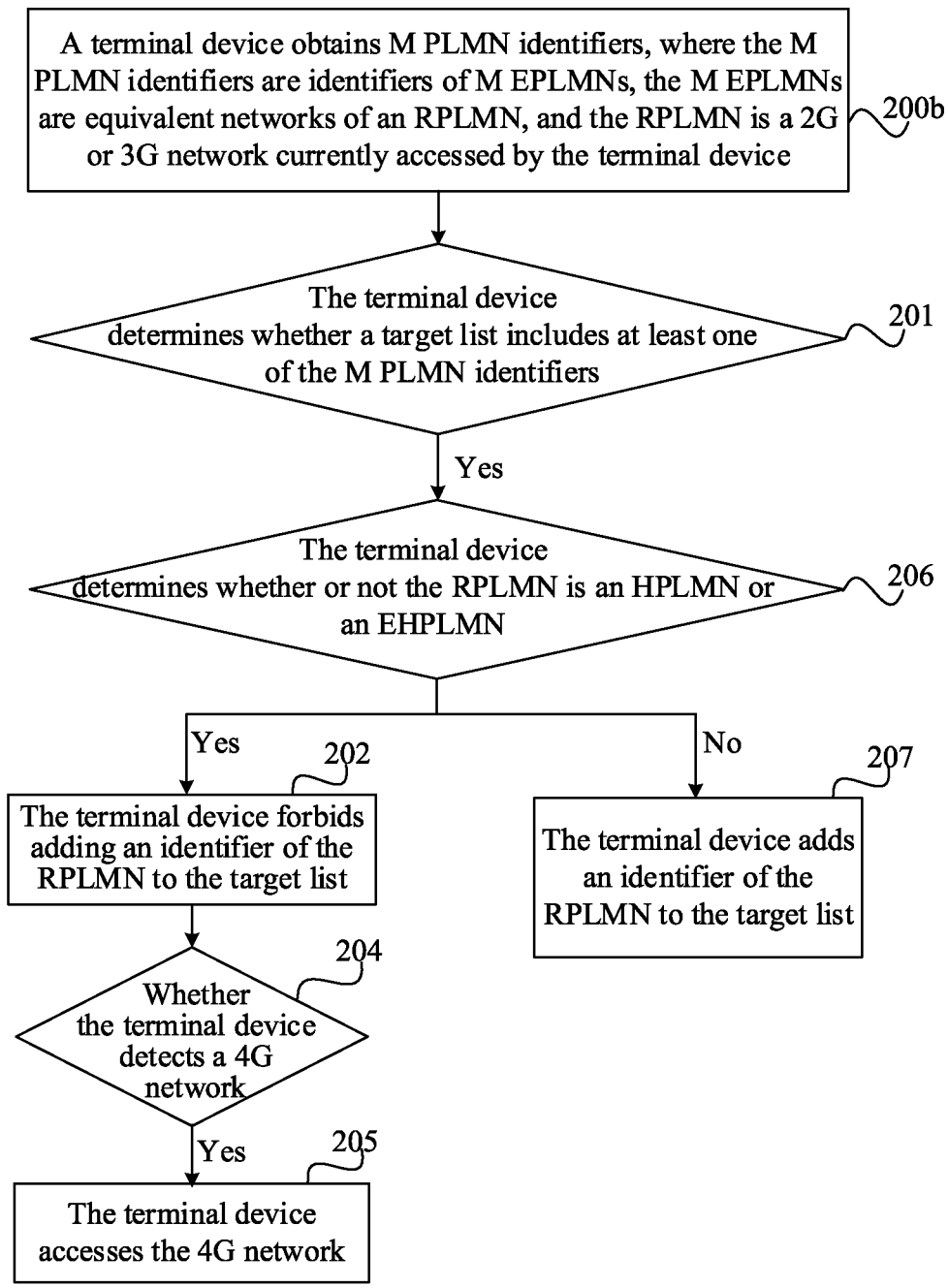
FIG. 6 is a fourth schematic diagram of a network information processing method according to an embodiment of this disclosure.

Optionally, with reference to FIG. 5, as shown in FIG. 6, after the foregoing step 201 and before the foregoing step 202, the network information processing method provided in this embodiment of this disclosure may further include the following step 206.

Step 206: The terminal device determines whether or not the RPLMN is an HPLMN or an EHPLMN.

In this embodiment of this disclosure, the terminal device compares the identifier of the RPLMN with an identifier of the HPLMN or an identifier of the EHPLMN to determine whether the identifier of the RPLMN matches the identifier of the HPLMN or EHPLMN, and then determines whether or not the RPLMN is an HPLMN or an EHPLMN.

If the terminal device determines that the RPLMN is an HPLMN or EHPLMN, the terminal device may proceed to perform the foregoing step 202, that is, the terminal device may forbid adding the identifier of the RPLMN to the target list.

If the terminal device determines that the RPLMN is not an HPLMN or EHPLMN, the terminal device may proceed to perform the following step 207, that is, add the identifier of the RPLMN to the target list.

In this embodiment of this disclosure, the terminal device may determine whether the RPLMN is a home network (an equivalent home PLMN list does not exist or is empty) or an equivalent home network EHPLMN (an equivalent home PLMN list exists and is not empty). If the terminal device determines that the RPLMN is an HPLMN or EHPLMN, the terminal device may forbid adding the identifier of the RPLMN to the target list; if the RPLMN is not an HPLMN or EHPLMN, the terminal device may add the identifier of the RPLMN to the target list.

In this situation, the HPLMN/EHPLMN has a higher chance of successfully registering with a 4G network, and the RPLMN should not be affected by the "forbidden 4G PLMN list". In this way, this embodiment of this disclosure can avoid a problem of slow network camping caused by frequent attempts when the 4G network cannot be registered with, thereby increasing a 4G registration success rate.

Figure 7:
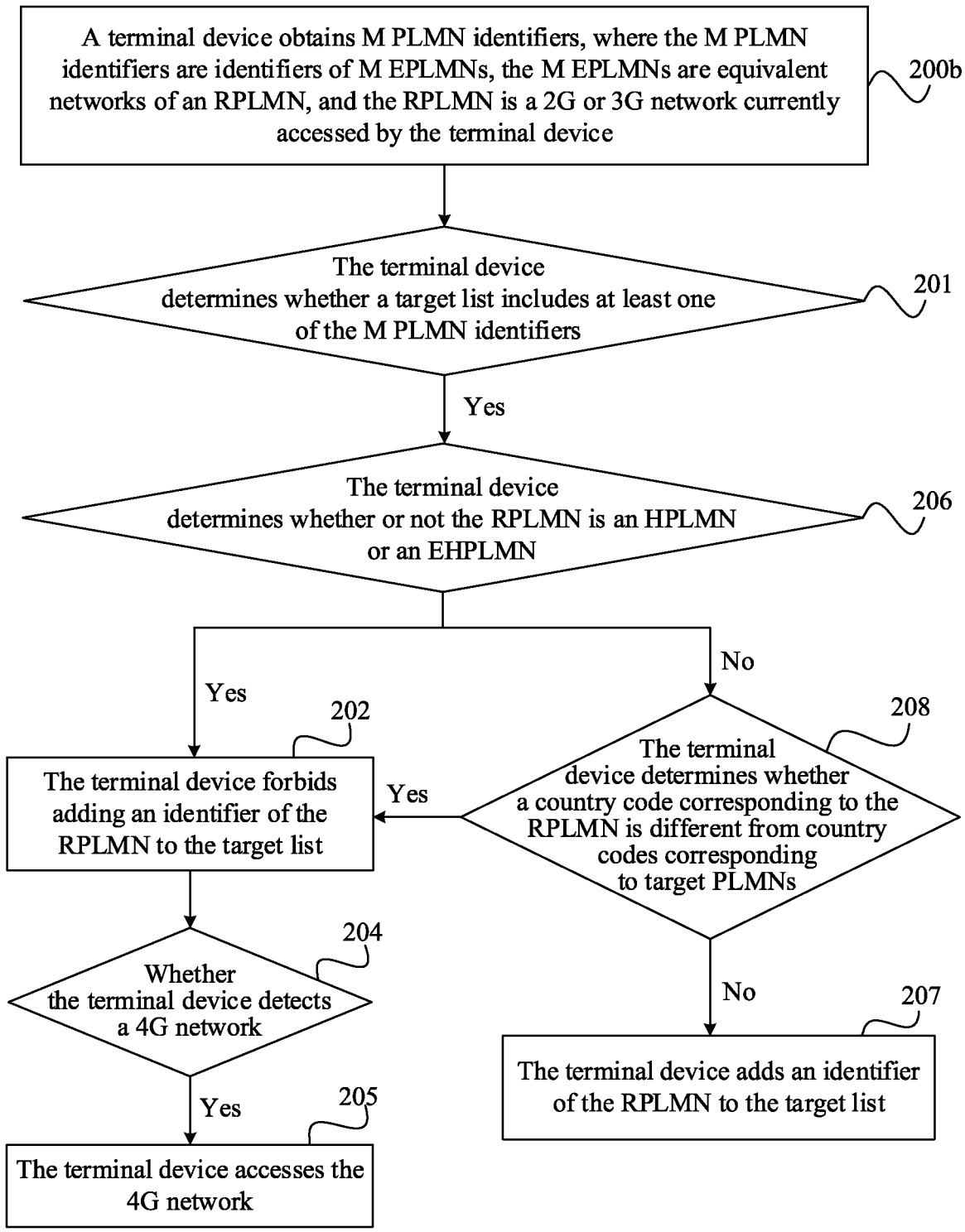
FIG. 7 is a fifth schematic diagram of a network information processing method according to an embodiment of this disclosure.

Optionally, with reference to FIG. 6, as shown in FIG. 7, after the foregoing step 206, the network information processing method provided in this embodiment of this disclosure may further include the following step 208.

Step 208: The terminal device determines whether a country code corresponding to the RPLMN is different from a country code corresponding to a target PLMN.

The target PLMN is all PLMNs in the target list.

In this embodiment of this disclosure, in a case that in the foregoing step 201, the terminal device determines that the EPLMNs corresponding to the RPLMN are recorded in the "forbidden 4G PLMN list", if the EPLMNs do not include the RPLMN, EPLMN(s) recorded in the "forbidden 4G PLMN list" are all recorded in a "forbidden EPLMN 4G PLMN list"; and if the EPLMNs include the RPLMN, all EPLMN(s) except the RPLMN in the "forbidden 4G PLMN list" are recorded in the "forbidden EPLMN 4G PLMN list". Specifically, the terminal device may determine whether an RPLMN MCC (mobile country code) is different from any PLMN MCC in the "forbidden EPLMN 4G PLMN list".

In this embodiment of this disclosure, the terminal device may compare the country code corresponding to the RPLMN with the country codes of all the PLMNs in the target list to determine whether the country codes corresponding to the RPLMN is different from the country codes of all the PLMNs in the target list.

If the terminal device determines that the country code corresponding to the RPLMN is different from the country codes of all the PLMNs in the target list ("Yes" in FIG. 7), the terminal device may proceed to perform the foregoing step 202. Specifically, in the case that the RPLMN is not an HPLMN or not an EHPLMN and that the country code corresponding to the RPLMN is different from the country code corresponding to the target PLMN, the terminal device may forbid adding the identifier of the RPLMN to the target list.

If the terminal device determines that the country code corresponding to the RPLMN is the same as the country code corresponding to the target PLMN ("No" in FIG. 7), the terminal device may proceed to perform the foregoing step 207. Specifically, in the case that the RPLMN is not an HPLMN or not an EHPLMN and that the country code corresponding to the RPLMN is the same as the country code corresponding to the target PLMN, the terminal device may add the identifier of the RPLMN to the target list.

In this situation, at some border areas, for example, from Hong Kong to Shenzhen, a mainland network (MCC is 460) with a Hong Kong network PLMN (MCC is 454) is used as an EPLMN. In this scenario, the RPLMN should not be affected by an EPLMN forbidden list. In this way, this embodiment of this disclosure can avoid a problem of slow network camping caused by frequent attempts when the 4G network cannot be registered with, thereby increasing a 4G registration success rate.

Figure 8:
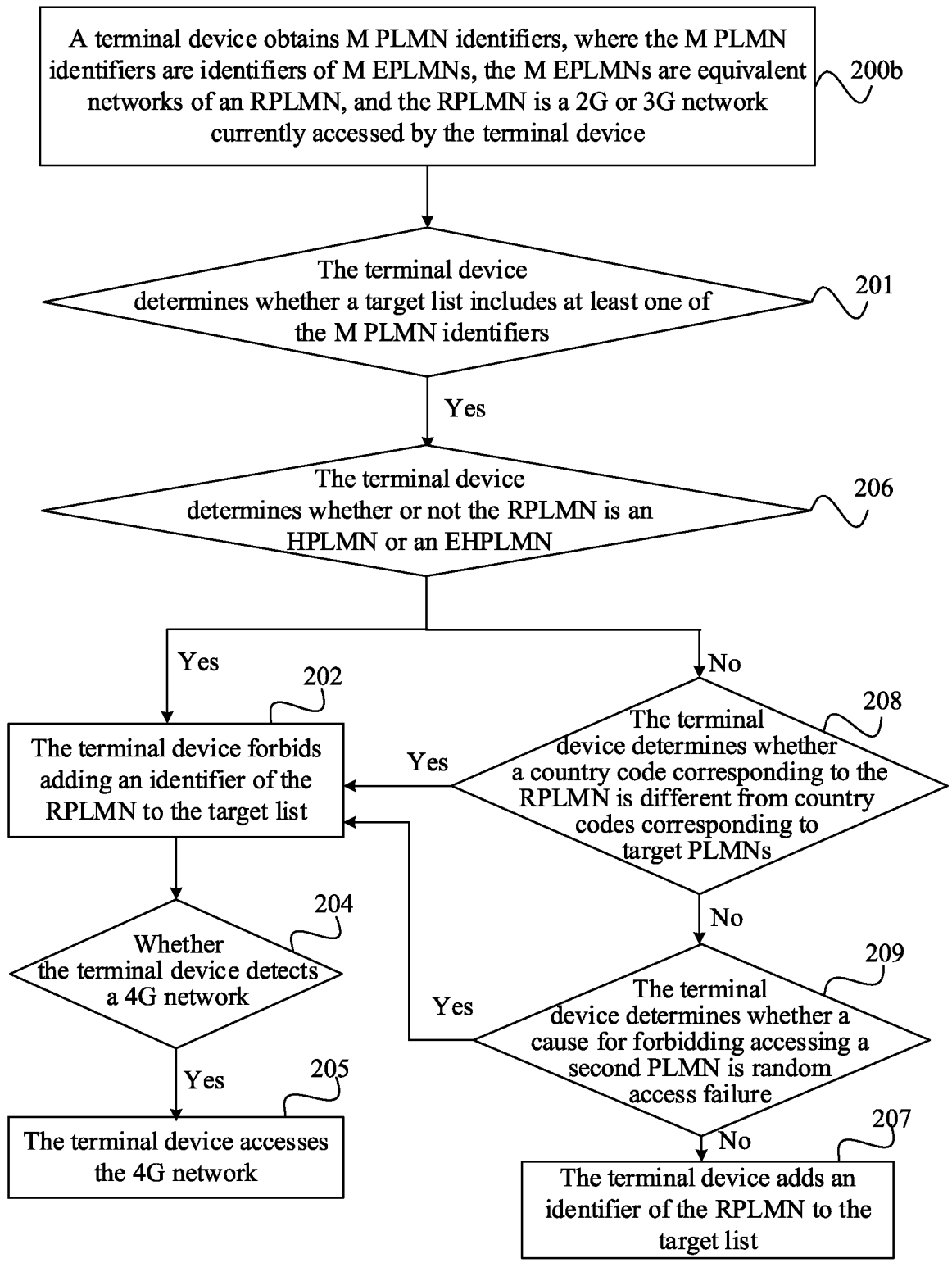
FIG. 8 is a sixth schematic diagram of a network information processing method according to an embodiment of this disclosure.

Optionally, with reference to FIG. 7, as shown in FIG. 8, after the foregoing step 208, the network information processing method provided in this embodiment of this disclosure may further include the following step 209.

Step 209: The terminal device determines that a cause for forbidding accessing a second PLMN is random access failure.

The second PLMN is a PLMN indicated by the at least one PLMN identifier.

In this embodiment of this disclosure, the terminal device may determine whether the cause for forbidding accessing a second PLMN is random access failure, through a forbidden cause value of the second PLMN recorded in the target list.

In the case that the RPLMN is not an HPLMN or not an EHPLMN, that the country code corresponding to the RPLMN is the same as a country code corresponding to a first PLMN (the first PLMN is any PLMN in the target list), and that a cause for forbidding accessing a second PLMN is random access failure, the terminal device may forbid adding the identifier of the RPLMN to the target list (step 202 in FIG. 8).

In the case that the RPLMN is not an HPLMN or not an EHPLMN, that the country code corresponding to the RPLMN is the same as a country code corresponding to a first PLMN, and that a cause for forbidding accessing a second PLMN is not random access failure, the terminal device adds the identifier of the RPLMN to the target list (step 207 in FIG. 8).

In this situation, because the random access failure is usually related to the wireless environment of the currently accessed network (for example, weak signals), the RPLMN should not be affected by the EPLMN forbidden list. In this way, this embodiment of this disclosure can avoid a problem of slow network camping caused by frequent attempts when the 4G network cannot be registered with, thereby increasing a 4G registration success rate.

In this embodiment of this disclosure, when an EPLMN configured for an RPLMN 2G/3G network exists in the "forbidden 4G PLMN list", the terminal device determines, according to the HPLMN, shared MCC or not shared MCC, and an EPLMN forbidden cause, whether to forbid the RPLMN 4G. This not only increases a 4G registration success rate, but also avoids a problem of slow network camping caused by frequent attempts when a 4G network cannot be registered with.

Figure 9:
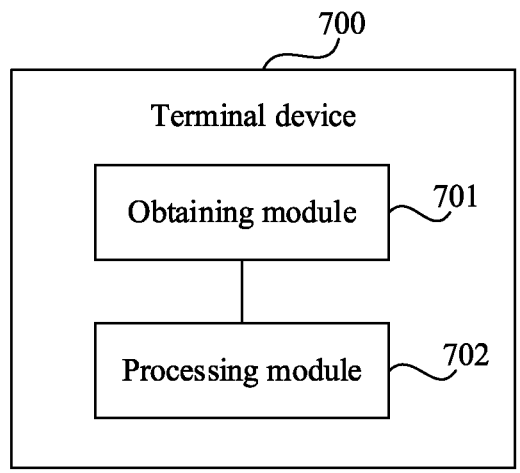
FIG. 9 is a first schematic structural diagram of a terminal device according to an embodiment of this disclosure.

As shown in FIG. 9, an embodiment of this disclosure provides a terminal device 700, where the terminal device 700 may include an obtaining module 701 and a processing module 702. The obtaining module 701 is configured to obtain M PLMN identifiers, where the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer. The processing module 702 is configured to, in a case that a target list of the terminal device includes at least one of the M PLMN identifiers obtained by the obtaining module 701, forbid adding an identifier of the RPLMN to the target list, where the PLMN identifier in the target list is an identifier of a PLMN in which the terminal device is forbidden from accessing a 4G network.

Figure 10:
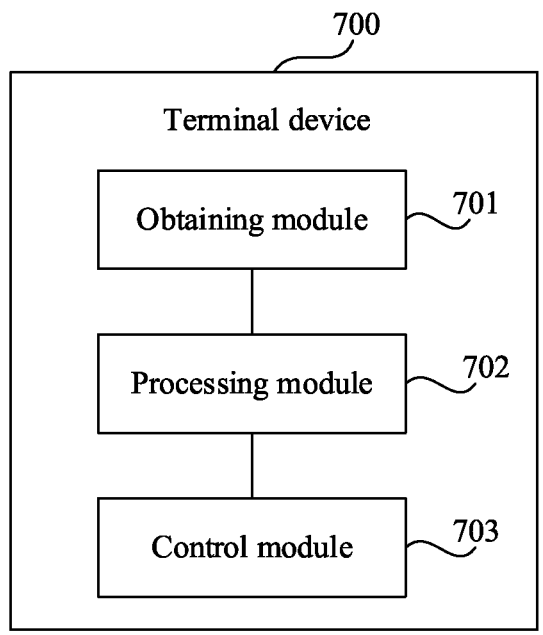
FIG. 10 is a second schematic structural diagram of a terminal device according to an embodiment of this disclosure.

Optionally, in this embodiment of this disclosure, the RPLMN may be a 4G network. In this case, with reference to FIG. 9, as shown in FIG. 10, the terminal device 700 provided in this embodiment of this disclosure may further include a control module 703. The control module 703 is configured to, after the processing module 702 forbids adding the identifier of the RPLMN to the target list, control the terminal device to camp on the 4G network.

Optionally, in this embodiment of this disclosure, the RPLMN may be a 2G network or a 3G network. In this case, the control module 703 is further configured to, after the processing module 702 forbids adding the identifier of the RPLMN to the target list, in a case that a 4G network is detected, control the terminal device to access the 4G network.

Optionally, in this embodiment of this disclosure, the processing module 702 is specifically configured to, in a case that the RPLMN is a home public land mobile network HPLMN or an equivalent home public land mobile network EHPLMN, forbid adding the identifier of the RPLMN to the target list.

Optionally, in this embodiment of this disclosure, the processing module 702 is further specifically configured to, in a case that the RPLMN is not an HPLMN or not an EHPLMN and that a country code corresponding to the RPLMN is different from a country code corresponding to a target PLMN, forbid adding the identifier of the RPLMN to the target list, where the target PLMN is all PLMNs in the target list.

Optionally, in this embodiment of this disclosure, the processing module 702 is further specifically configured to, in a case that the RPLMN is not an HPLMN or not an EHPLMN, that a country code corresponding to the RPLMN is the same as a country code corresponding to a first PLMN, and that a cause for forbidding accessing a second PLMN is random access failure, forbid adding the identifier of the RPLMN to the target list, where the first PLMN is any PLMN in the target list, and the second PLMN is a PLMN indicated by the at least one PLMN identifier.

Optionally, in this embodiment of this disclosure, the processing module 702 is further specifically configured to, in a case that the RPLMN is not an HPLMN or not an EHPLMN, that a country code corresponding to the RPLMN is the same as a country code corresponding to a first PLMN, and that a cause for forbidding accessing a second PLMN is not random access failure, add the identifier of the RPLMN to the target list.

The terminal device provided in this embodiment of this disclosure can implement each process implemented by the terminal device in the foregoing method embodiment. Details are not described herein again to avoid repetition.

In the terminal device provided in this embodiment of this disclosure, M PLMN identifiers may be obtained, where the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer; and in a case that a target list of the terminal device includes at least one of the M PLMN identifiers obtained by an obtaining module, an identifier of the RPLMN is forbidden from being added to the target list, where the PLMN identifier in the target list is an identifier of a PLMN in which the terminal device is forbidden from accessing a 4G network. With this solution, when an EPLMN configured by a network is in a "forbidden 4G PLMN list", the terminal device can effectively decide whether it is necessary to forbid a 4G RPLMN service, so that the embodiments of this disclosure can not only increase a 4G registration success rate, but also can avoid a problem of slow network camping caused by frequent attempts when a 4G network cannot be registered with.

Figure 11:
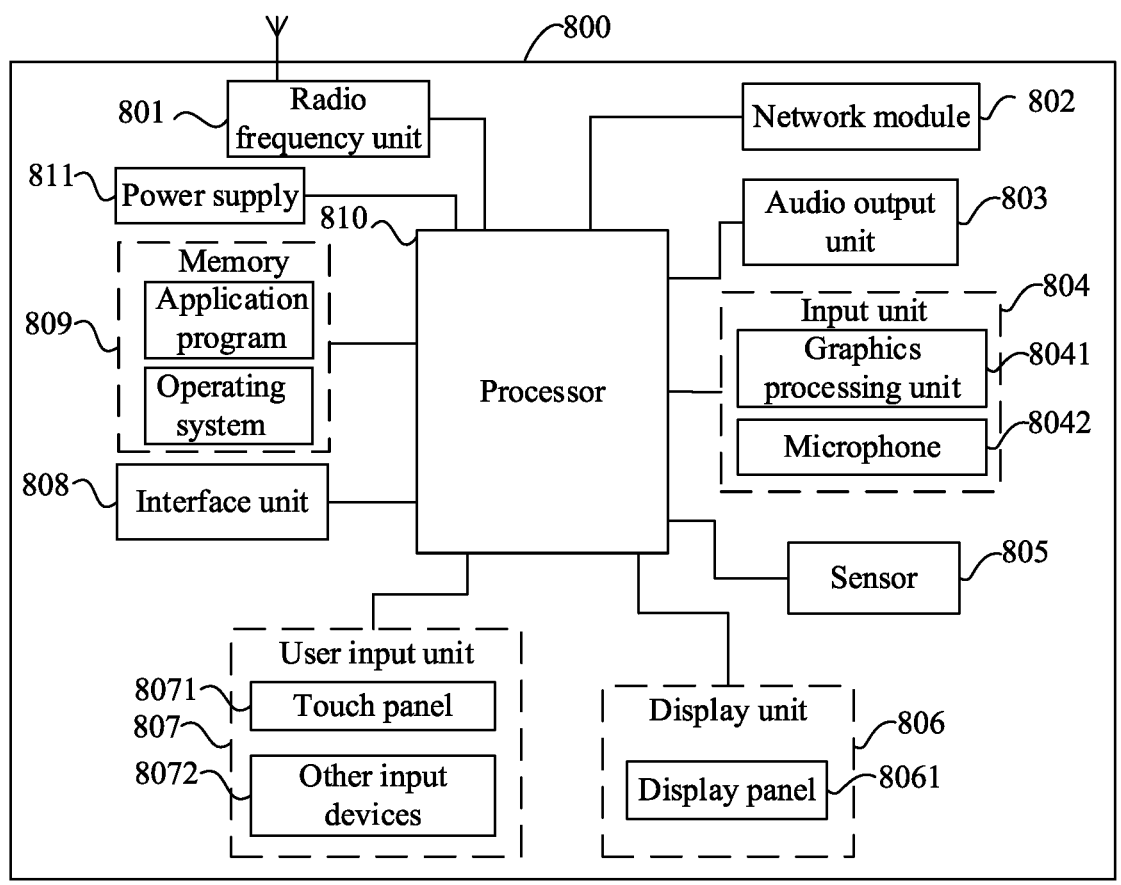
FIG. 11 is a schematic diagram of hardware of a terminal device according to an embodiment of this disclosure.

FIG. 11 is a schematic diagram of a hardware structure of a terminal device for implementing the embodiments of this disclosure. As shown in FIG. 11, the terminal device 800 includes but is not limited to parts such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the terminal device is not limited to the terminal device structure shown in FIG. 11. The terminal device may include more or fewer components than those shown in the figure, or combine some of the components, or arrange the components differently. In this embodiment of this disclosure, the terminal device includes but is not limited to a mobile phone, a tablet computer, a laptop computer, a palmtop computer, an in-vehicle terminal, a wearable device, a pedometer, and the like.

The processor 810 is configured to obtain M PLMN identifiers, where the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer; and in a case that a target list of the terminal device includes at least one of the M PLMN identifiers obtained by an obtaining module, forbid adding an identifier of the RPLMN to the target list, where the PLMN identifier in the target list is an identifier of a PLMN in which the terminal device is forbidden from accessing a 4G network.

In the terminal device provided in this embodiment of this disclosure, the terminal device may obtain M PLMN identifiers, where the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer; and in a case that a target list of the terminal device includes at least one of the M PLMN identifiers obtained by an obtaining module, forbid adding an identifier of the RPLMN to the target list, where the PLMN identifier in the target list is an identifier of a PLMN in which the terminal device is forbidden from accessing a 4G network. With this solution, when an EPLMN configured by a network is in a "forbidden 4G PLMN list", the terminal device can effectively decide whether it is necessary to forbid a 4G RPLMN service, so that the embodiments of this disclosure can not only increase a 4G registration success rate, but also can avoid a problem of slow network camping caused by frequent attempts when a 4G network cannot be registered with.

It should be understood that, in this embodiment of this disclosure, the radio frequency unit 801 may be configured to transmit and receive a signal in an information transmitting/receiving or call process. Specifically, the radio frequency unit 801 receives downlink data from a base station and transmits the downlink data to the processor 810 for processing; and transmits uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device through a wireless communications system.

The terminal device 800 provides a user with wireless broadband Internet access by using the network module 802, for example, helping the user to transmit or receive an email, browse a web page, and access streaming media.

The audio output unit 803 may convert audio data received by the radio frequency unit 801 or the network module 802 or stored in the memory 809 into an audio signal, and output the audio signal as a sound. In addition, the audio output unit 803 may also provide audio output (for example, a call signal received sound or a message received sound) related to a specific function performed by the terminal device 800. The audio output unit 803 includes a speaker, a buzzer, a receiver, and the like.

The input unit 804 is configured to receive an audio or video signal. The input unit 804 may include a graphics processing unit (GPU) 8041 and a microphone 8042. The graphics processing unit 8041 processes image data of a still picture or a video obtained by an image capture apparatus (for example, a camera) in an image capture mode or a video capture mode. A processed image frame may be displayed on the display unit 806. The image frame processed by the graphics processing unit 8041 may be stored in the memory 809 (or another storage medium) or transmitted by using the radio frequency unit 801 or the network module 802. The microphone 8042 can receive sounds and process such sounds into audio data. The processed audio data can be converted in a telephone call mode into a format that can be transmitted by the radio frequency unit 801 to a mobile communication base station, for outputting.

The terminal device 800 further includes at least one sensor 805, for example, an optical sensor, a motion sensor, and other sensors. Specifically, the optical sensor includes an ambient light sensor and a proximity sensor. The ambient light sensor may adjust luminance of a display panel 8061 based on brightness of ambient light. The proximity sensor may turn off and/or backlight of the display panel 8061 when the terminal device 800 moves to an ear. As a motion sensor, an accelerometer sensor may detect magnitudes of an acceleration in various directions (usually three axes), may detect a magnitude and a direction of gravity when the terminal is static, and may be configured to recognize a posture of the terminal device (for example, landscape/portrait mode switching, a related game, or magnetometer posture calibration), provide a function related to vibration recognition (for example, a pedometer or a keystroke), or the like. The sensor 805 may further include a fingerprint sensor, a pressure sensor, an iris sensor, a molecular sensor, a gyroscope, a barometer, a hygrometer, a thermometer, or an infrared sensor. Details are not described herein.

The display unit 806 is configured to display information input by the user or information provided to the user. The display unit 806 may include the display panel 8061. The display panel 8061 may be configured in a form of a liquid crystal display (LCD), an organic light-emitting diode (OLED), or the like.

The user input unit 807 may be configured to receive entered numerical or character information, and generate key signal input that is related to user setting and function control of the terminal device. Specifically, the user input unit 807 includes a touch panel 8071 and other input devices 8072. The touch panel 8071, or referred to as a touchscreen, may capture a touch operation performed by a user on or near the touch panel 8071 (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 810, and receives and executes a command transmitted by the processor 810. In addition, the touch panel 8071 may be implemented in a plurality of forms, for example, as a resistive, capacitive, infrared, or surface acoustic wave touch panel. In addition to the touch panel 8071, the user input unit 807 may further include other input devices 8072. Specifically, the other input devices 8072 may include but are not limited to a physical keyboard, a function key (for example, a volume control key or a switch key), a trackball, a mouse, and a joystick. Details are not described herein.

Further, the touch panel 8071 may cover the display panel 8061. After detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. Although the touch panel 8071 and the display panel 8061 are used as two separate components to implement input and output functions of the terminal device in FIG. 11, the touch panel 8071 and the display panel 8061 may be integrated to implement the input and output functions of the terminal device in some embodiments. This is not specifically limited herein.

The interface unit 808 is an interface for connecting an external apparatus to the terminal device 800. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 808 may be configured to receive an input (for example, data information or power) from an external apparatus and transmit the received input to one or more elements within the terminal device 800, or may be configured to transmit data between the terminal device 800 and the external apparatus.

The memory 809 may be configured to store software programs and various data. The memory 809 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 809 may include a high-speed random access memory, and may further include a non-volatile memory such as a disk storage device, a flash memory device, or another volatile solid-state storage device.

The processor 810 is a control center of the terminal device. The processor 810 uses various interfaces and lines to connect all parts of the entire terminal device, and performs various functions and data processing of the terminal device by running or executing the software program and/or module stored in the memory 809 and invoking data stored in the memory 809, thereby performing overall monitoring on the terminal device. The processor 810 may include one or more processing units. Optionally, the processor 810 may integrate an application processor and a modem processor. The application processor mainly processes an operating system, a user interface, an application program, and the like. The modem processor mainly processes wireless communication. It can be understood that the modem processor may alternatively be not integrated in the processor 810.

The terminal device 800 may further include the power supply 811 (for example, a battery) that supplies power to the components. Optionally, the power supply 811 may be logically connected to the processor 810 through a power management system, so as to implement functions such as charging management, discharging management, and power consumption management through the power management system.

In addition, the terminal device 800 includes some functional modules that are not shown. Details are not described herein.

Optionally, an embodiment of this disclosure further provides a terminal device, including a processor 810, a memory 809, and a computer program stored in the memory 809 and capable of running on the processor 810, as shown in FIG. 11. When the computer program is executed by the processor 810, the processes of the foregoing network information processing method embodiment are implemented, with the same technical effects achieved. To avoid repetition, details are not described herein again.

An embodiment of this disclosure further provides a computer-readable storage medium, where the computer-readable storage medium stores a computer program. When the computer program is executed by a processor, the processes of the foregoing network information processing method embodiment are implemented, with the same technical effects achieved. To avoid repetition, details are not described herein again. The computer-readable storage medium may include a read-only memory (ROM), a random access memory (RAM), a magnetic disk, an optical disc, or the like.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal device (which may be a mobile phone, a computer, a server, an air conditioner, a network device, or the like) to perform the methods disclosed in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A network information processing method, applied to a terminal device, wherein the method comprises:
   obtaining M PLMN identifiers, wherein the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer; and
   determining that a target list of the terminal device comprises at least one of the M PLMN identifiers, and in response to determining that the target list of the terminal device comprises at least one of the M PLMN identifiers, forbidding adding an identifier of the RPLMN to the target list, wherein the PLMN identifier in the target list is an identifier of a PLMN in which the terminal device is forbidden from accessing a 4G network.

2. The method according to claim 1, wherein the RPLMN is a 4G network; and
   after the forbidding adding an identifier of the RPLMN to the target list, the method further comprises:
   camping on the 4G network.

3. The method according to claim 1, wherein the RPLMN is a 2G network or a 3G network; and
   after the forbidding adding an identifier of the RPLMN to the target list, the method further comprises:
   determining that a 4G network is detected, and in response to determining that the 4G network is detected, accessing the 4G network.

4. The method according to claim 3, wherein the forbidding adding an identifier of the RPLMN to the target list comprises:
   determining that the RPLMN is a home public land mobile network HPLMN or an equivalent home public land mobile network EHPLMN, and in response to determining that the RPLMN is the HPLMN or the EHPLMN, forbidding adding the identifier of the RPLMN to the target list.

5. The method according to claim 3, wherein the method further comprises:
   determining that the RPLMN is not an HPLMN or not an EHPLMN and that a country code corresponding to the RPLMN is different from a country code corresponding to a target PLMN, and in response to determining that the RPLMN is not the HPLMN or not the EHPLMN and that the country code corresponding to the RPLMN is different from the country code corresponding to the target PLMN, forbidding adding the identifier of the RPLMN to the target list, wherein the target PLMN is all PLMNs in the target list.

6. The method according to claim 3, wherein the method further comprises:
   determining that the RPLMN is not an HPLMN or not an EHPLMN, that a country code corresponding to the RPLMN is the same as a country code corresponding to a first PLMN, and that a cause for forbidding accessing a second PLMN is random access failure, and in response to determining that the RPLMN is not the HPLMN or not the EHPLMN, that the country code corresponding to the RPLMN is the same as the country code corresponding to the first PLMN, and that the cause for forbidding accessing the second PLMN is random access failure, forbidding adding the identifier of the RPLMN to the target list, wherein the first PLMN is any PLMN in the target list, and the second PLMN is a PLMN indicated by the at least one PLMN identifier.

7. The method according to claim 3, wherein the method further comprises:
   determining that the RPLMN is not an HPLMN or not an EHPLMN, that a country code corresponding to the RPLMN is the same as a country code corresponding to a first PLMN, and that a cause for forbidding accessing a second PLMN is not random access failure, and in response to determining that the RPLMN is not the HPLMN or not the EHPLMN, that the country code corresponding to the RPLMN is the same as the country code corresponding to the first PLMN, and that the cause for forbidding accessing the second PLMN is not random access failure, adding the identifier of the RPLMN to the target list.

8. A terminal device, wherein the terminal device comprises a processor, a memory, and a computer program stored in the memory and capable of running on the processor, wherein the computer program is executed by the processor to implement:
obtaining M PLMN identifiers, wherein the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer; and
in a case that a target list of the terminal device comprises at least one of the M PLMN identifiers, forbidding adding an identifier of the RPLMN to the target list, wherein the PLMN identifier in the target list is an identifier of a PLMN in which the terminal device is forbidden from accessing a 4G network.

9. The terminal device according to claim 8, wherein the RPLMN is a 4G network; and the computer program is further executed by the processor to implement:
after the forbidding adding an identifier of the RPLMN to the target list,
camping on the 4G network.

10. The terminal device according to claim 8, wherein the RPLMN is a 2G network or a 3G network; and the computer program is further executed by the processor to implement:
after the forbidding adding an identifier of the RPLMN to the target list,
in a case that a 4G network is detected, accessing the 4G network.

11. The terminal device according to claim 10, wherein the computer program is further executed by the processor to implement:
in a case that the RPLMN is a home public land mobile network HPLMN or an equivalent home public land mobile network EHPLMN, forbidding adding the identifier of the RPLMN to the target list.

12. The terminal device according to claim 10, wherein the computer program is further executed by the processor to implement:
in a case that the RPLMN is not an HPLMN or not an EHPLMN and that a country code corresponding to the RPLMN is different from a country code corresponding to a target PLMN, forbidding adding the identifier of the RPLMN to the target list, wherein the target PLMN is all PLMNs in the target list.

13. The terminal device according to claim 10, wherein the computer program is further executed by the processor to implement:
in a case that the RPLMN is not an HPLMN or not an EHPLMN, that a country code corresponding to the RPLMN is the same as a country code corresponding to a first PLMN, and that a cause for forbidding accessing a second PLMN is random access failure, forbidding adding the identifier of the RPLMN to the target list, wherein the first PLMN is any PLMN in the target list, and the second PLMN is a PLMN indicated by the at least one PLMN identifier.

14. The terminal device according to claim 10, wherein the computer program is further executed by the processor to implement:
in a case that the RPLMN is not an HPLMN or not an EHPLMN, that a country code corresponding to the RPLMN is the same as a country code corresponding to a first PLMN, and that a cause for forbidding accessing a second PLMN is not random access failure, adding the identifier of the RPLMN to the target list.

15. A non-transitory computer-readable storage medium, wherein the non-transitory computer-readable storage medium stores a computer program, and the computer program is executed by a processor to implement:
obtaining M PLMN identifiers, wherein the M PLMN identifiers are identifiers of M equivalent public land mobile networks EPLMNs, the M EPLMNs are equivalent networks of a registered public land mobile network RPLMN, the RPLMN is a network currently accessed by the terminal device, and M is a positive integer; and
in a case that a target list of the terminal device comprises at least one of the M PLMN identifiers, forbidding adding an identifier of the RPLMN to the target list, wherein the PLMN identifier in the target list is an identifier of a PLMN in which the terminal device is forbidden from accessing a 4G network.

16. The non-transitory computer-readable storage medium according to claim 15, wherein the RPLMN is a 4G network; and the computer program is further executed by the processor to implement:
after the forbidding adding an identifier of the RPLMN to the target list,
camping on the 4G network.

17. The non-transitory computer-readable storage medium according to claim 15, wherein the RPLMN is a 2G network or a 3G network; and the computer program is further executed by the processor to implement:
after the forbidding adding an identifier of the RPLMN to the target list,
in a case that a 4G network is detected, accessing the 4G network.

18. The non-transitory computer-readable storage medium according to claim 17, wherein the computer program is further executed by the processor to implement:
in a case that the RPLMN is a home public land mobile network HPLMN or an equivalent home public land mobile network EHPLMN, forbidding adding the identifier of the RPLMN to the target list.

19. The non-transitory computer-readable storage medium according to claim 17, wherein the computer program is further executed by the processor to implement:
in a case that the RPLMN is not an HPLMN or not an EHPLMN and that a country code corresponding to the RPLMN is different from a country code corresponding to a target PLMN, forbidding adding the identifier of the RPLMN to the target list, wherein the target PLMN is all PLMNs in the target list.

20. The non-transitory computer-readable storage medium according to claim 17, wherein the computer program is further executed by the processor to implement:
in a case that the RPLMN is not an HPLMN or not an EHPLMN, that a country code corresponding to the RPLMN is the same as a country code corresponding to a first PLMN, and that a cause for forbidding accessing a second PLMN is random access failure, forbidding adding the identifier of the RPLMN to the target list, wherein the first PLMN is any PLMN in the target list, and the second PLMN is a PLMN indicated by the at least one PLMN identifier.

* * * * *